United States Patent
Groot

(10) Patent No.: US 12,289,225 B2
(45) Date of Patent: *Apr. 29, 2025

(54) CONFIGURABLE NETWORK TRAFFIC PARSER

(71) Applicant: FORESCOUT TECHNOLOGIES, INC., San Jose, CA (US)

(72) Inventor: Samuel Groot, Eindhoven (IL)

(73) Assignee: Forescout Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/466,263

(22) Filed: Sep. 13, 2023

(65) Prior Publication Data

US 2024/0007384 A1 Jan. 4, 2024

Related U.S. Application Data

(63) Continuation of application No. 17/953,813, filed on Sep. 27, 2022, now Pat. No. 11,765,066, which is a continuation of application No. 17/139,713, filed on Dec. 31, 2020, now Pat. No. 11,463,340.

(51) Int. Cl.
*H04L 43/18* (2022.01)
*H04L 9/40* (2022.01)

(52) U.S. Cl.
CPC .............. *H04L 43/18* (2013.01); *H04L 63/20* (2013.01)

(58) Field of Classification Search
CPC .............................. H04L 43/18; H04L 63/20
USPC ....................................................... 709/224
See application file for complete search history.

(56) References Cited

U.S. PATENT DOCUMENTS

| | | | |
|---|---|---|---|
| 6,157,955 A | 12/2000 | Narad et al. | |
| 8,638,793 B1 * | 1/2014 | Ben-Mayor | H04L 69/22 726/13 |
| 8,934,495 B1 | 1/2015 | Hilton et al. | |
| 9,817,773 B2 | 11/2017 | Lim et al. | |
| 2003/0227925 A1 | 12/2003 | Matsuo et al. | |
| 2011/0206064 A1 | 8/2011 | Head et al. | |
| 2012/0236756 A1 | 9/2012 | Bennett et al. | |
| 2015/0052243 A1 | 2/2015 | Lumezanu et al. | |
| 2016/0019170 A1 * | 1/2016 | Lim | G06F 9/4881 711/151 |
| 2016/0191306 A1 | 6/2016 | Gasparakis et al. | |
| 2016/0234091 A1 | 8/2016 | Emmadi et al. | |
| 2017/0257388 A1 | 9/2017 | Addepalli et al. | |
| 2017/0318045 A1 | 11/2017 | Johns et al. | |
| 2019/0273731 A1 | 9/2019 | Kassner et al. | |

OTHER PUBLICATIONS

International Search Report and Written Opinion on the Patentability of Application No. PCT/US2021/062448 Mailed Mar. 11, 2022, 13 pages.

\* cited by examiner

*Primary Examiner* — James E Springer
(74) *Attorney, Agent, or Firm* — Womble Bond Dickinson (US) LLP

(57) ABSTRACT

Systems, methods, and related technologies for parsing network traffic are described. Network traffic transmitted by a set of devices communicatively coupled to a network is obtained. The network traffic is parsed to determine a set of field values from the network traffic based on the set of protocol fields. The set of field values are transmitted to the set of processing engines.

20 Claims, 7 Drawing Sheets

CONFIGURABLE NETWORK TRAFFIC PARSER

RELATED APPLICATIONS

This application is a continuation of U.S. patent application Ser. No. 17/953,813, filed Sep. 27, 2022, which is a continuation of a U.S. patent application Ser. No. 17/139,713, filed Dec. 31, 2020, now U.S. Pat. No. 11,463,340, which is incorporated herein by reference in its entirety to provide continuity of disclosure.

TECHNICAL FIELD

Aspects and implementations of the present disclosure relate to network monitoring, and more specifically, parsing network traffic.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
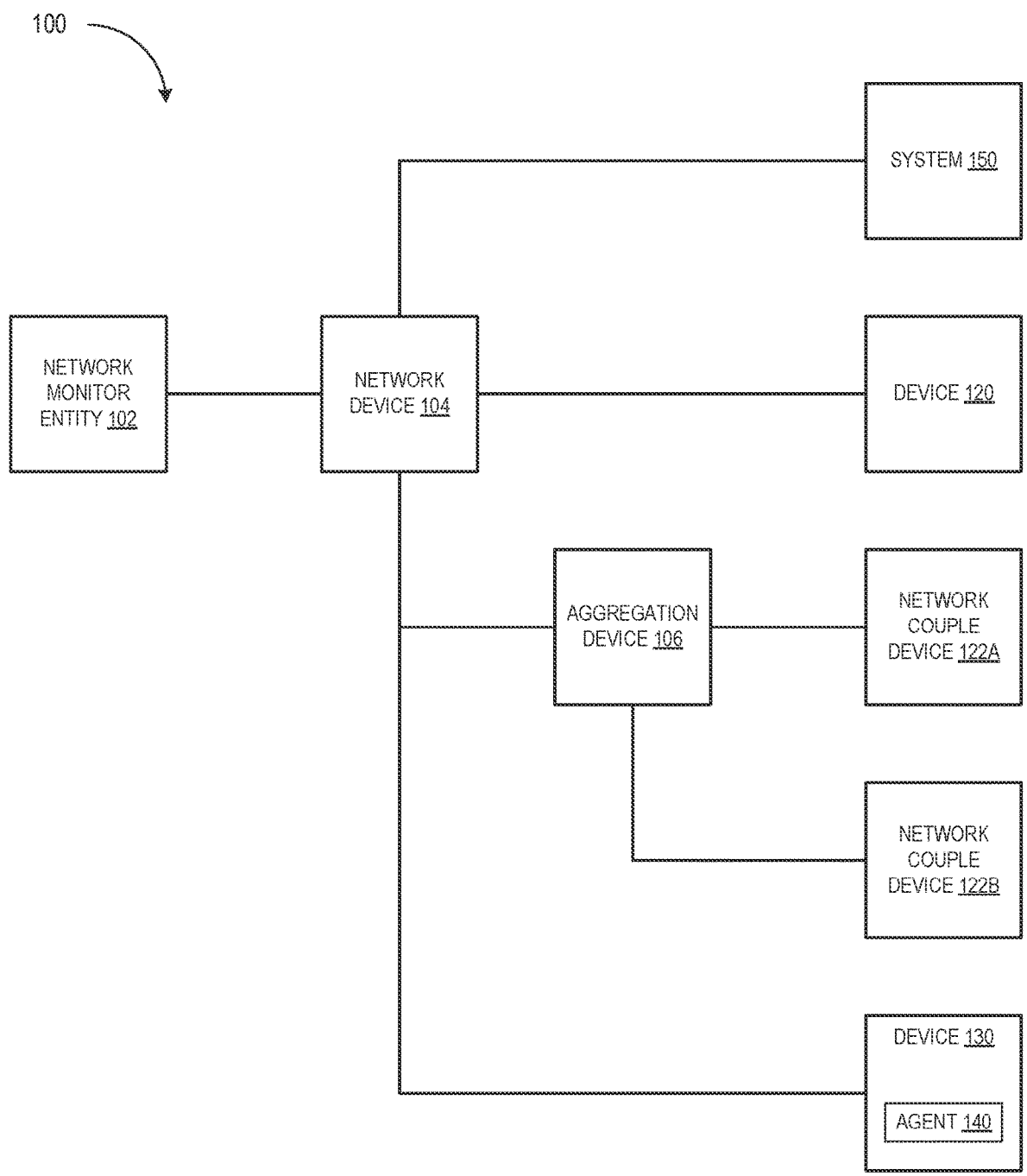
FIG. 1 depicts an illustrative communication network in accordance with one implementation of the present disclosure.

Aspects and implementations of the present disclosure are directed to training and using a configurable parser or parsing engine to parse (e.g., process, read, analyze, etc.) different protocol fields of network traffic. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification can be particularly important for securing a network because lack of knowledge about what a device is can prevent application of appropriate security measures. In addition, performing various actions, such a security actions, may also help maintain network security. Classifying devices and performing actions to maintain network security is often based on the network traffic (e.g., packets, messages, frames, etc.) transmitted by the devices. Accordingly, described herein in various implementations are systems, methods, techniques, and related technologies, which allow for improved processing, which may include parsing, of network traffic.

Accordingly, described herein in various implementations are systems, methods, techniques, and related technologies, which enable a parsing engine (e.g., a parser) to parse network traffic more quickly, efficiently, or a combination thereof. Various processing engines may perform different actions, function, operations, etc., based on field values of protocol fields (e.g., portions of network traffic, such as portions of headers). For example, a processing engine may classify an entity or a device based on a protocol field of the network traffic. In another example, a processing engine may perform various actions, such as security actions based on a protocol field of the network traffic. The processing engines may register with the parsing engine to indicate which protocol portions (e.g., fields, portions thereof, etc.) are requested by the processing engines.

The parsing engine may determine which protocol fields of the network traffic should be parsed while receiving and parsing network traffic. For example, the parsing engine may determine which protocol fields have been requested by the different processing engines based on requests (e.g., messages indicating one or more protocol fields) received from the different processing engines. The parsing engine may parse, extract, etc., the requested protocol fields in the network traffic. The field values of the requested protocol fields may be transmitted to the processing engines. The parsing engine may refrain from parsing other protocol fields that were not requested by the processing engines. For example, the parsing engine may not parse all of the fields (e.g., a select set of fields) of the network traffic. In another example, the parsing engine may skip parsing some fields or may selectively parse certain fields.

Previous parsing approaches have had several problems. Previous parsing approaches would parse all of the protocol fields for network traffic. This would increase the amount of time to parse a protocol field that a particular processing engine may be interested in. In addition, parsing all of the protocol fields in the network traffic may increase the amount of resources used by the parser.

In some embodiments, the parsing engine may allow for more efficient use of the resources of a network monitor entity. By not parsing all of the protocol fields of the network traffic, the parsing engine may use fewer resources (e.g., computing resources, memory resources, etc.) of the network monitor entity. This may also reduce the cost of operation for the network monitor entity. For example, using less processing power to parse fewer fields may allow the network monitor entity to consume less power. The parsing engine may also be able to operate on other network monitor entities that have less processing capabilities.

In one embodiment, the parsing engine may also be able to parse network traffic more quickly. For example, rather than parsing each of the protocol fields in network traffic (which would take a longer amount of time), the parsing engine may focus on the protocol fields that were requested by the processing engines which may allow the parsing engine to determine the fields values more quickly, efficiently, etc.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its devices and the amount of work or labor involved in configuring network devices.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122a-b. Network device 104 may be one or more network switches, access points, routers, firewalls, hubs, etc.

Network monitor entity 102 may be operable for a variety of tasks including determining one or more properties, one or more classifications security actions, as described herein. Network monitor entity 102 can perform the classification using one or more models (e.g., processing engines). In some embodiments, network monitor entity 102 can use local resources (e.g., processing, memory, data resources, or other resources), cloud resources, or a combination thereof for performing the classifications. In various embodiments, the classifications from one or more models may be combined with one or more classifications based on a profiles, fingerprints, etc., as described herein.

Network monitor entity 102 may further train the one or more models for use in determining or inferring the one or more classifications. Each model may be trained on a select data set (e.g., training data, etc.) to classify a device or an entity. The trained models may be deployed locally, in the cloud, or a combination thereof for classification by one or more network monitor entities.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled or connected to a network. In various embodiments, network monitor entity 102 access syslog or SNMP information from a device itself to determine where a device is communicatively coupled or connected to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 determines the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and modifying classification or associated thresholds associated one or more models, as described herein. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, as described herein.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122*a-b*. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122*a-b* on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122*a-b* and provide network access to network coupled devices 122*a-b*. Aggregation device 106 may further be configured to provide information (e.g., operating system, device software information, device software versions, device names, application present, running, or both, vulnerabilities, patch level, etc.) to network monitor entity 102 about the network coupled devices 122*a-b*. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor entity 102. It is appreciated that log information may be particularly reliable for stable network environments (e.g., where the types of devices on the network do not change often). The log information may include information of updates of software of network coupled devices 122a-b.

Figure 2:
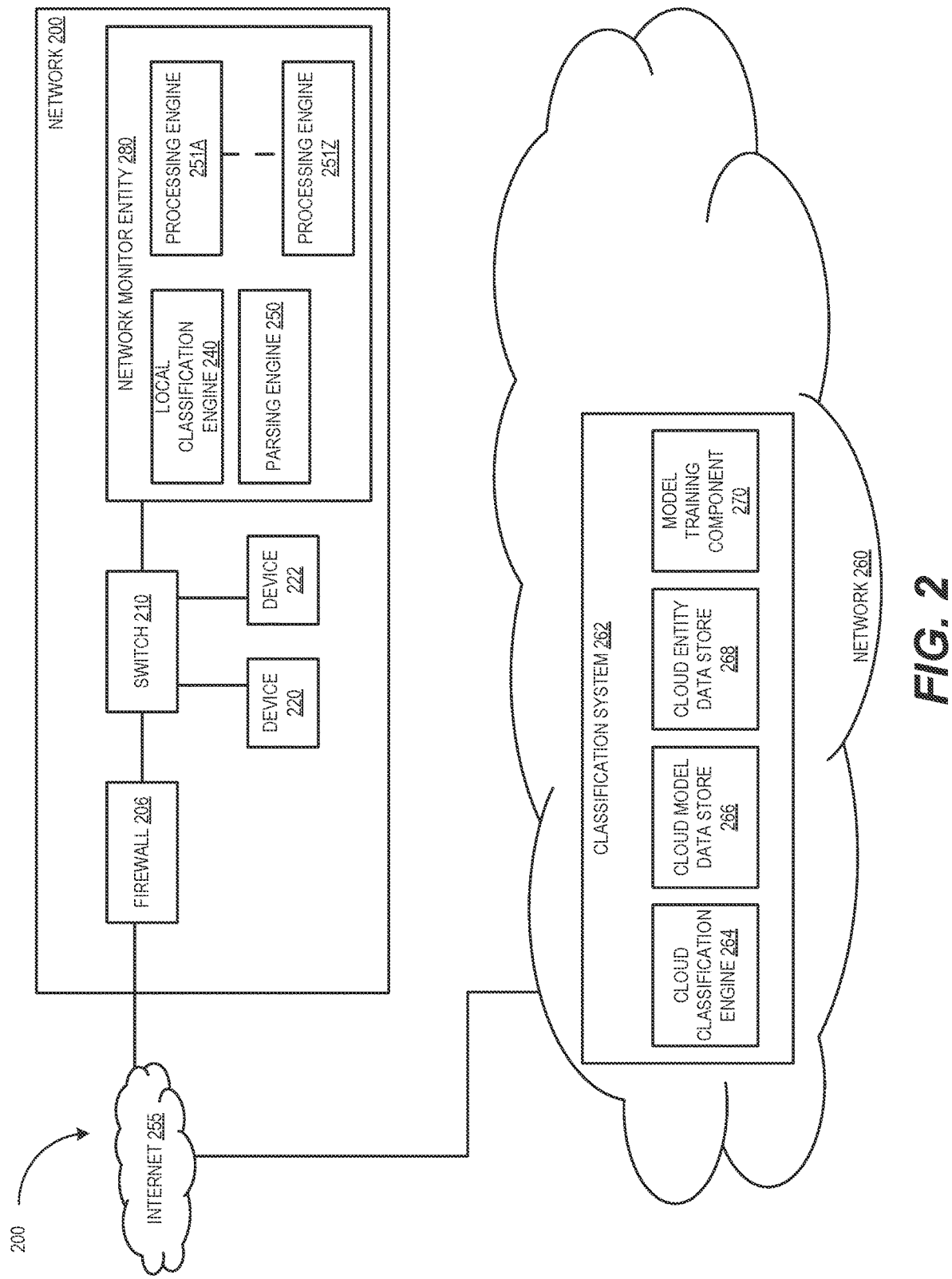
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., an example/implementation of network monitor entity 102) which can perform or determine one or more classifications, as described herein, associated with the various entities communicatively coupled in example network 200. Network monitor entity 280 may further perform training of one or more models for use in classification, as described herein.

Classification system 262 may be a cloud classification system operable to perform classification of a device. In some embodiments, classification system 262 may be part of a larger system operable to perform a variety of functions, e.g., part of a cloud based network monitor device/entity, security device, etc. Classification system 262 may further be operable to train one or more models for classifying devices or entities. Example components are shown of network monitor entity 280 and classification system 262 and other components may be present or included.

FIG. 2 shows example devices 220-222 (e.g., devices 106, 122a-b, 120, and 130, other physical or virtual devices, other entities, etc.) and it is appreciated that more or fewer network devices or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based device or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various devices of network 200 including firewall 206, network monitor entity 280, and devices 220-222. Firewall 206 may perform network address translation (NAT). Firewall 206 communicatively couples network 200 to Internet 255 and firewall 206 may restrict or allow access to Internet 255 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of a device of network 200 by sending one or more requests to the device of network 200. The information from passive and active scans of entities of network 200 can be used to determine one or more properties associated with the entities of network 200.

Network monitor entity 280 includes local classification engine 240 which may perform classification of the entities of network 200 including firewall 206, switch 210, and devices 220-222.

Local classification engine 240 can send data (e.g., property values) about entities of network 200, as determined by local classification engine 240, to classification system 262. Local classification engine 240 may encode and encrypt the data prior to sending the data to classification system 262. In some embodiments, local classification engine 240 checks the confidence of each classification and communicates with classification system 262 data to perform a classification. Local classification engine 240 may receive a classification from classification system 262 which network monitor entity 280 can use to perform various security related or other measures. In some embodiments, classification of a device may be performed in part by local network monitor entity 280 (e.g., local classification engine 240) and in part by classification system 262.

The network device 280 also includes parsing engine 250 and processing engines 251A through 251Z. The parsing engine 250 may parse (e.g., analyze, read, decode, decipher, process, etc.) network traffic such as messages, packets, frames, etc. For example, the parsing engine 250 may read values (e.g., field values) of certain protocol fields or other protocol portions in network traffic. The network traffic may be transmitted by devices 220 and 222. The processing engines 251A through 251Z may perform various actions, operations, functions, etc., based on the field values. For example, the processing engine 251A may further classify a device based on the field values of certain protocol fields. In another example, processing engine 251A may perform one or more security actions (e.g., drop network traffic, block a device, etc.), based on the fields of certain protocol fields.

Classification system 262 can perform a cloud based classification, as described herein. In some embodiments, classification system 262 includes cloud classification engine 264, cloud model data store 266, cloud entity data store 268, and model training component 270.

Cloud classification engine 264 may perform classification based on data received from network monitor entity 280 (e.g., based on features determined using properties of a device), as described herein. Cloud classification engine 264 may unencrypt and decode the information received prior to performing a classification. Cloud classification engine 264 may use cloud model data store 266 in determining a classification based on one or more models associated with various granularities. A classification determined by cloud classification engine 264 can be sent back to network monitor entity 280. Cloud classification engine 264 may be an example of a processing engine that is not located on the network monitor entity 280 (e.g., that is separate from the network monitor entity 280).

Cloud model data store 266 is model data store (e.g., a cloud model database) with each model associated with a level (e.g., granularity), as described herein. Cloud profile data store 266 is not subject to the resource conditions or limitations (e.g., processing power, storage, etc.) that may impact network monitor entity 280 (e.g., and local classification engine 240). Cloud entity data store 268 is a data store (e.g., a cloud entity database) of device information that has been uploaded to classification system 262. For example, the data in cloud entity data store 268 may include entity or device name, operating system, function, vendor/model, and host information from a variety of networks (e.g., that have network monitor entities configured to upload device information).

Model training component 270 is configured to train one or more models at various levels, as described herein. The data of cloud entity data store 268 may be used by model training component 270 to train one or more models. Cloud entity data store 268 may be used to train one or more of the models of cloud model data store 266. Model training component 270 may further evaluate models and determine respective confidence thresholds associated with each model, as described herein.

Both local classification engine 240 and cloud classification engine 264 may use profile based classification along with other classification methods in conjunction with classifications based on various models associated with various levels.

Figure 3:
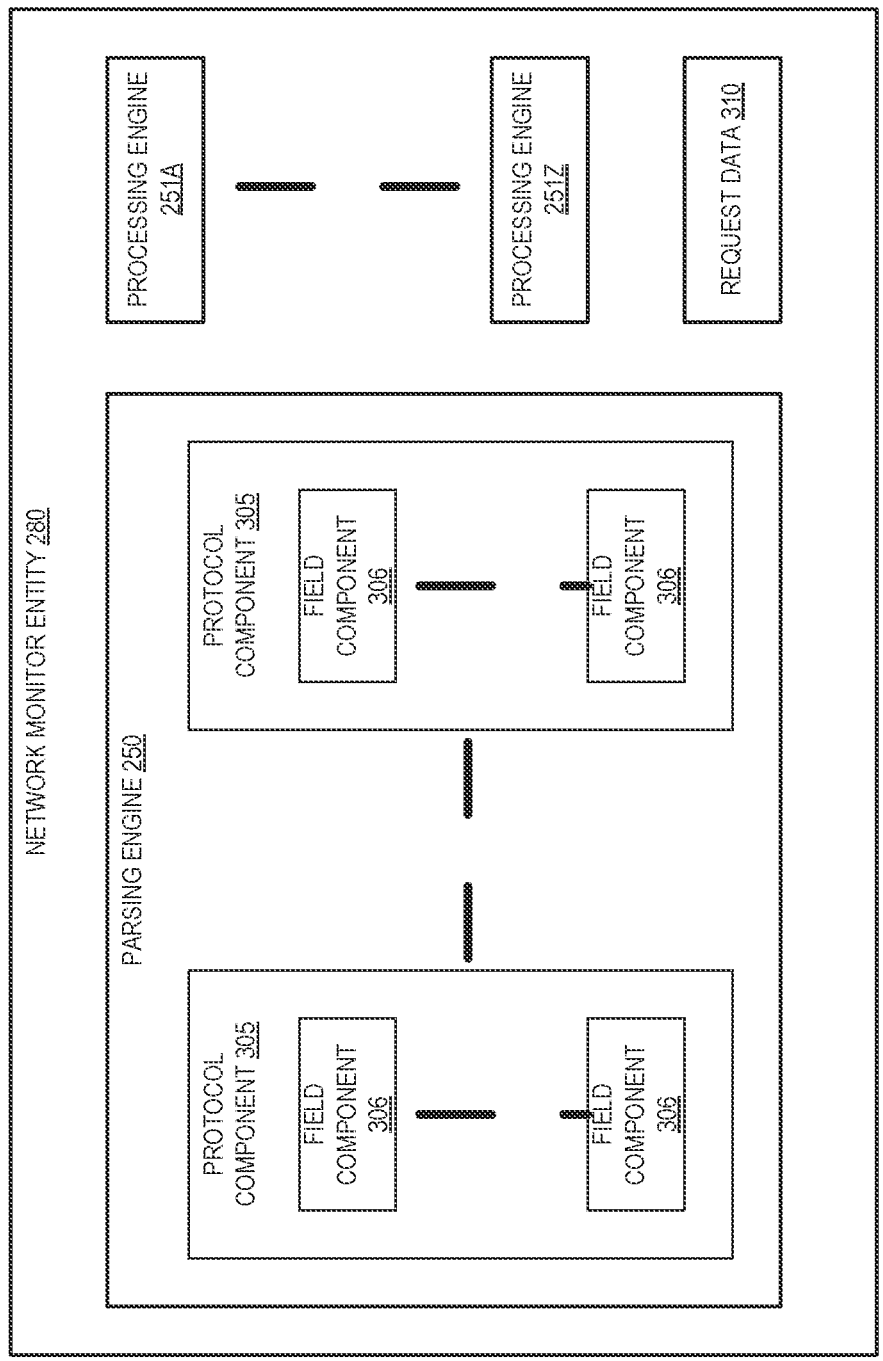
FIG. 3 is a block diagram illustrating an example parsing engine, in accordance with one implementation of the present disclosure.

FIG. 3 is a block diagram illustrating an example parsing engine 250 (e.g., as part of network monitor entity 280), in accordance with one implementation of the present disclosure. The network monitor entity 280 may monitor a variety of protocols and entities or devices. Network monitor entity 280 may be operable for a variety of tasks including parsing network traffic, determining one or more properties, determining one or more classifications, etc., as described herein. Network monitor entity 280 can determine one or more enforcement points where a device is communicatively coupled to the network and thereby determine the one or more enforcement points closest to the device. In various embodiments, network monitor entity 280 may access the current configuration of the one or more enforcement points to determine the access rules (e.g., ACLs) that are to be applied to the one or more enforcement points, as described herein. Network monitor entity 280 may then apply or assign the access rules to the one or more enforcement points closest to the device.

The network monitor entity 280 includes a parsing engine 250 and processing engines 251A through 251Z. As discussed above, the parsing engine 250 may parse (e.g., analyze, read, decode, decipher, process, etc.) network traffic such as messages, packets, frames, portions thereof, etc. The network traffic may be transmitted by one or more entities or devices that are communicatively coupled to a network (e.g., transmitted by devices 220 and 222 in the network 200 of FIG. 2).

The network traffic may include different protocol fields. For example, each packet (e.g., network traffic) may include different fields (e.g., different portions of the packet). The parsing engine 250 may be capable of parsing (e.g., reading) the different protocol fields of the network traffic. The parsing engine 250 may further be able of parsing one or more portions of one or more protocol fields. For example, the parsing engine 250 may be able to parse transmission control protocol (TCP) packets, or may be able to parse user datagram protocol (UDP) packets. The network traffic parsed by the parsing engine 250 may be associated with a particular network protocol used by the devices that transmitted the network traffic. For example, the network traffic may be TCP packets transmitted by a set of devices, for instance, IP cameras, programmable logic controllers (PLCs), etc.

The parsing engine 250 may determine a set of protocol fields (e.g., one or more protocol fields) for parsing the network traffic. For example, the set of protocol fields may indicate which fields (e.g., portions of a packet header, packet payload, packet footer, etc.) that should be parsed (e.g., analyzed, accessed, read, etc.) by the parsing engine 250. Each protocol field of the set of protocol fields may be associated with one or more of the processing engines 251A through 251Z. For example, a first protocol field may be associated with processing engine 251A, and a second protocol field may be associated with processing engines 251A and 251B. A protocol field may be associated with a processing engine when the processing engine transmits a registration request to the parsing engine 250. The registration request may indicate one or more protocol fields that the processing engine is interested in. The registration request may also include an identifier (e.g., a name, a serial number, an alphanumeric string, etc.) for the processing engine that sent the request.

The parsing engine 250 may determine the set of protocol fields based on request data 310 (e.g., a table, a list, a data structure, or some other data). As discussed above, each of processing engine 251A through 251Z may transmit a request to indicate one or more protocol fields that are of use or interest to the processing engine. The request data 310 may indicate one or more protocol fields or portions thereof and the processing engines that requested each protocol field. For example, the request data 310 may be a table that associates protocol fields with one or more processing engines that requested the protocol fields (e.g., may include a list of identifiers for processing engines that requested a protocol field).

The parsing engine 250 may parse the set of protocol fields of the network traffic to determine (e.g., obtain, extract, etc.) a set of field values (e.g., one or more field values) for the set of protocol fields. For example, the parsing engine 250 may parse IP packets (e.g., network traffic) transmitted by a device (e.g., a laptop computer, a smart phone, a smart device, etc.). The parsing engine 250 may parse (e.g., read, analyze, etc.) one or more fields of the IP packets, such as the "destination" (e.g., destination address) field. For example, the parsing engine 250 may analyze or read the portion (e.g., the bytes) of the IP packet where the "destination" field is located. The parsing engine 250 may determine one or more field values for the one or more fields of the IP packets. For example, the parsing engine 250 may determine (e.g., read) the destination IP address for an IP packet by analyzing or reading the portion of the IP packet where the "destination" field is located.

The parsing engine 250 may also transmit a set of field values (that were obtained by parsing the network traffic based on the set of protocol fields), to one or more of the processing engines 251A through 251Z. As discussed above, the request data 310 may indicate a protocol field and the processing engines that requested the protocol field. For each field value of a protocol field, the parsing engine 250 may determine which of the processing engines 251A through 251Z request the protocol filed and may transmit the field value to those processing engines (e.g., only to those processing engines).

The parsing engine 250 may refrain from determining one or more other field values of the network traffic. For example, the parsing engine 250 may not parse other protocol fields that are not part of the set of protocol fields (e.g., that are not indicated in the request data 310). In one embodiment, the parsing engine 250 may refrain from parsing all protocol fields that are not part of the set of protocol fields. For example, the parsing engine 250 may parse only the protocol fields that are part of the set of (requested) protocol fields (e.g., only the protocol files that are indicated in the request data 310).

In one embodiment, the parsing engine 250 may refrain from determining one or more other field values of the network traffic based on a processing capability of the network device (e.g., network monitor entity 280). For example, as discussed above, the request data 310 may indicate a set of protocol fields that should be parsed by the parsing engine 250. The other protocol fields that are not indicated in the request data 310 may form a second set of protocol fields. Based on the processing capability of the network monitor entity 280, the parsing engine 250 may modify the second set of protocol fields. For example, the parsing engine 250 may determine the type of processing device (e.g., central processing unit, processing core, processor, etc.), the amount of memory (e.g., random access memory (RAM), etc.) of the network monitor entity 280, etc. In another example, the parsing engine 250 may determine the processing device usage (e.g., CPU usage), memory usage, etc., of the network monitor entity 280. The available resources, such as computing/processing resources, memory resources, etc., of the computing device may also indicate the processing capabilities of the network monitor entity 280. For example, the amount of random access memory that is available for use (e.g., the amount of available memory resources) may indicate the processing capability of the network monitor entity 280. In another example, the amount of processing resources (e.g., the CPU utilization) may indicate the processing capability of the network monitor entity 280.

Based on the processing capabilities of the network monitor entity 280, the parsing engine 250 may determine that some of the protocol fields in the second set of protocol fields can be parsed. For example, if there is enough memory or the processing device is capable of processing at least some of the protocol fields in the second set of protocol fields (e.g., the CPU usage is below a threshold usage), the parsing engine 250 may parse those additional fields (from the second set of protocol fields) even though they were initially not part of the set of protocol fields. For example, a configuration file or setting may indicate protocol fields that should be parsed if there are available computing resources, even though those protocol fields were not requested by one of the processing engines 251A through 251Z. In another example, user input (e.g., from a network administrator) may indicate protocol fields that should be parsed if there are available computing resources, even though those protocol fields were not requested by one of the processing engines 251A through 251Z. The parsing engine 250 may update the second set of protocol fields to remove those additional protocol fields which can be parsed (due to the available processing capabilities of the network monitor entity 280).

In one embodiment, the parsing engine 250 may receive a request to update the set of protocol fields for parsing network traffic. For example, as discussed above, a processing engine, such as processing engine 251A, may transmit a request indicating a new set of protocol fields. The processing engine 251A may want to update the protocol fields that were previously requested. For example, the processing engine 251A may want to add a protocol field to the set of protocol fields. In another example, the processing engine 251A may want to remove a protocol field from the set of protocol fields. The processing engine 251A may transmit a request to the parsing engine 250 to update the set of protocol fields (e.g., to modify, add, remove, a protocol field from the set of protocol fields). The parsing engine 250 may update the set of protocol fields based on that request. For example, the parsing engine 250 may update the request data 310 to indicate that a parsing engine is no longer using or interested in a particular protocol field. In another example, the parsing engine 250 may update the request data 310 to indicate that a parsing engine 250 is interested in a particular protocol field. In one embodiment, the processing engines 251A through 251Z may update the request data 310 to indicate the fields that should be parsed. For example, processing engine 251A may directly update the request data 310 to add an additional protocol field. After updating the request data 310, the parsing engine 250 may continue to receive network data and may parse the network data based on the updated request data 310 (e.g., based on an update set of protocol fields indicated by the updated request data 310).

In some embodiments, the processing engines (that request different protocol fields) and the parsing engine 250 may both be located on the network monitor entity 280 (e.g., are located on the same entity or device). For example, parsing engine 250 and processing engines 251A through 251Z are located on the network monitor entity. In other embodiments, one or more of the processing engines that request different protocol fields and receive different protocol fields from the parsing engine 250 may be separate from the network monitor entity 280. For example, cloud classification engine 264 (illustrated in FIG. 2) may be an example of a processing engine that is separate from the network monitor entity 280.

As illustrated in FIG. 3, the parsing engine 250 includes protocol components 305. Each protocol component 305 may be associated with a type of network protocol. For example, a first protocol component 305 may be associated with the transmission control protocol (TCP). In another example, a second protocol component 305 may be associated with the user datagram protocol (UDP). Each protocol component 305 may parse network traffic for different protocol. For example, one protocol component 305 may be used to parse TCP packets, and another protocol component 305 may be used to parse UDP packets. The different protocol components 305 may allow the parsing engine 250 to handling different types of protocols (e.g., network protocols). If a new type of network protocol is being used by devices in the network, a new protocol component 305 may be installed, added, etc., to the parsing engine 250 to provide the parsing engine 250 with the capability to parse network traffic that uses the new network protocol. This may allow the parsing engine 250 to be updated more easily, quickly, efficiently, etc., to parse new types of network protocols. Each protocol component 305 may include a data structure, template, etc., that may indicate which protocol fields are used or defined by a protocol.

Also as illustrated in FIG. 3, each protocol component 305 includes field components 306. The field components 306 may allow the protocol component 305 to process different protocol fields for a protocol (e.g., a network protocol, a communications protocol, etc.). For example, each protocol field for a protocol may be associated with a field component 306. The respective field component 306 may be responsible for parsing the respective protocol field for a particular protocol. The parsing engine 250 may selectively use different protocol components 305 and field components 306 based on the request data 310. For example, based on which protocol fields were requested, the parsing engine 250 may use a particular set of field components 306 to parse the network traffic. Each field component 306 may include a data structure, template, etc., that may indicate information about a respective protocol field. For example, each field component 306 may include data indicating a size (e.g., in bytes) of the protocol field, a location of the protocol field within a header (e.g., the byte location), etc.

In one embodiment, the parsing engine 250 may allow for more efficient use of the resources of the network monitor entity 280. For example, rather than parsing all of the protocol fields in network traffic, the parsing engine 250 may parse (e.g., selectively parse) the protocol fields that were requested by the processing engines 251A through 251Z. This allows the parsing engine 250 to use fewer resources (e.g., computing resources, memory resources, etc.) of the network monitor entity 280 while parsing network traffic. For example, rather than using more resources to parse all of the protocol fields in network traffic, the parsing engine may parse the requested protocol fields and use fewer resources.

In one embodiment, the parsing engine 250 may also reduce the cost of operation for the network monitor entity 280. As discussed above, fewer resources (e.g., computing resources, memory resources, etc.) may be used by the parsing engine. This may allow the amount of power used by the network monitor entity 280 to be reduced. For example, using less processing power may allow the network monitor entity 280 to consume less power thereby reducing the cost of operation.

In one embodiment, the parsing engine 250 may also be able to parse network traffic more quickly. For example, rather than parsing all of the protocol fields in network traffic (which take a longer amount of time), the parsing engine 250 may focus on, select, access, identify, determine, etc., the protocol fields that were requested by the processing engines 251A through 251Z. This may allow the parsing engine to provide field values to the processing engines 251A through 251Z more quickly, efficiently, etc.

In one embodiment, the parsing engine 250 may be able to operate on other network monitor entities or devices that have less processing capabilities. For example, another network device may have a slower processing device (e.g., CPU) and less memory. Because the parsing engine 250 may not parse each or substantially all of the protocol fields in network traffic (which user more computing and storage resources), the parsing engine 250 may still be able to parse network traffic on the other network device (e.g., parse the network traffic within a time frame or time limit), even though the other network devices has less processing capabilities.

Figure 4:
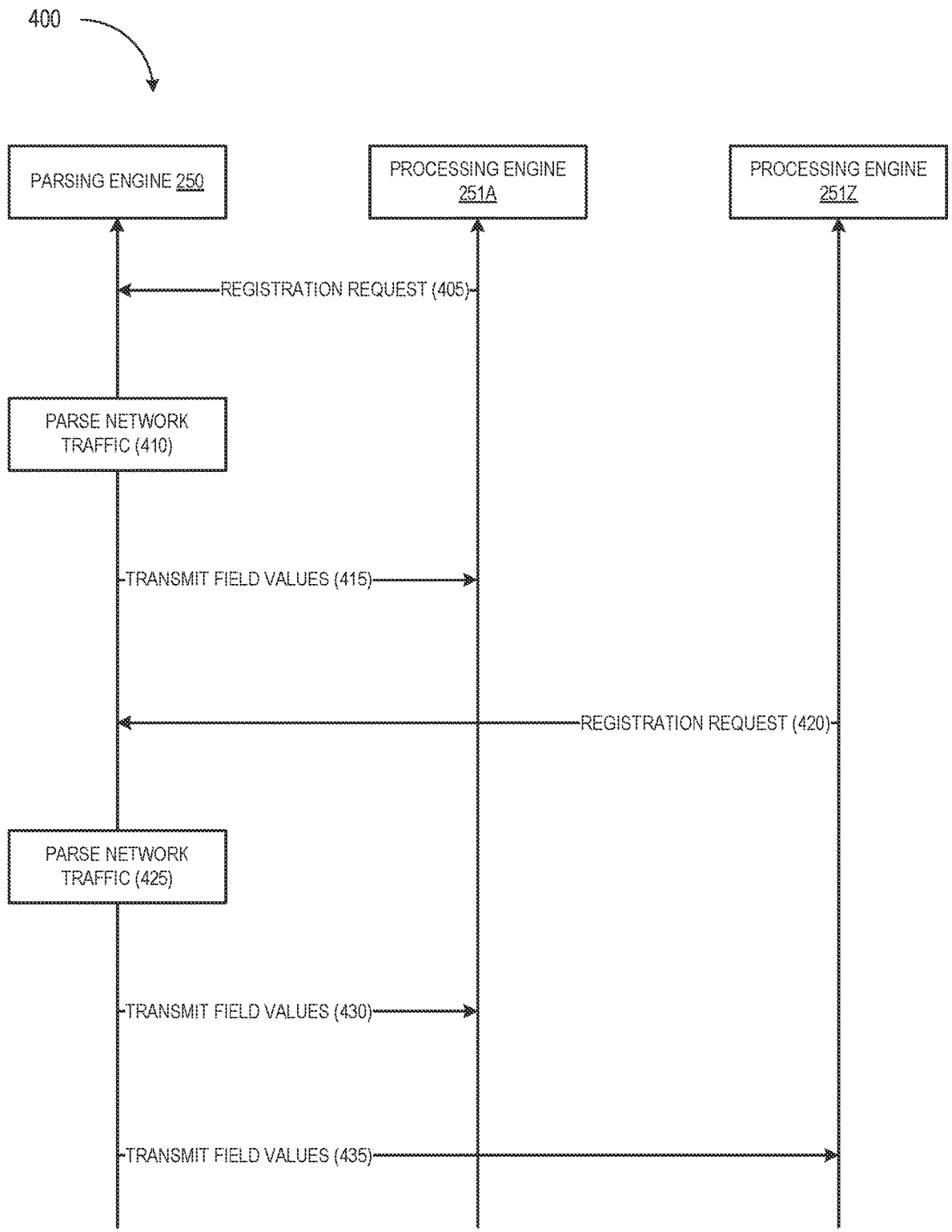
FIG. 4 depicts an example sequence diagram which illustrates operations that may be performed a parsing engine and one or more processing engines, in accordance with one implementation of the present disclosure.

FIG. 4 depicts an example sequence diagram 400 which illustrates operations (e.g., including communications) that may be performed by a parsing engine 250 and one or more processing engines 251A and 251Z, in accordance with one implementation of the present disclosure. As discussed above, parsing engine 250 may parse network traffic for the processing engines 251A and 251Z to obtain or determine fields values for different protocol fields. The processing engines 251A and 251Z may perform various actions, operations, methods, functions, etc., based on the field values. For example, processing engine 251A may be a machine learning model that may generate one or more inferences (e.g., classification inference, risk inference, etc.) based on the field values. In another example, processing engine 251Z may enforce various security rules for a network based on the field values.

At operation 405, the processing engine 251A may transmit a registration request to the parsing engine 250. As discussed above, the registration request may indicate a first set of protocol fields for a protocol, that the processing engine 251A may use, may be interested in, or may be configured to process or act upon. For example, the registration request may indicate that the processing engine 251A is interested in the "source" field of TCP packets. The parsing engine 250 may update request data (e.g., request data 310 illustrated in FIG. 3) to indicate that the processing engine 251A is interested in the "source" field of TCP packets. For example, the parsing engine 250 may add an entry in a table that includes the "source" field and an identifier for the processing engine 251A.

At operation 410, the parsing engine 250 may parse network traffic based on the first set of protocol fields requested by the processing engine 251A. For example, the parsing engine 250 may obtain the field values of the "source" field in the TCP packets obtained by the parsing engine 250. At operation 415, parsing engine 250 may transmit the field values (e.g., the source TCP addresses) to the processing engine 251A.

At operation 420, the processing engine 251Z may transmit a second registration request to the parsing engine 250. The second registration request (from the processing engine 251Z) may indicate a second set of protocol fields for a protocol, that the processing engine 251Z may use or may be interested in. For example, the second registration request may indicate that the processing engine 251Z is interested in the "sequence number" field and the "source" field of TCP packets. The parsing engine 250 may update the request data (e.g., request data 310 illustrated in FIG. 3) to indicate that the processing engine 251Z is interested in the "sequence number" field. For example, the parsing engine 250 may add an entry in a table that includes the "sequence number" field and an identifier for the processing engine 251Z. The parsing engine 250 may also update the entry for the "source" field to indicate that the processing engine 251Z is also interested in the "source" field. For example, the parsing engine may add an identifier for the processing engine 251Z to the entry for the "source" field. At operation 425, the parsing engine 250 may parse additional network traffic based on the first set of protocol fields requested by the processing engine 251A and the second set of protocol fields requested by the processing engine 251Z. For example, the parsing engine 250 may obtain the field values of the "source" field and the "sequence number" field in the TCP packets obtained by the parsing engine 250 (e.g., obtained from network traffic). At operation 430, parsing engine 250 may transmit the field values for the "source" field to the processing engine 251A. At operation 435, the parsing engine 250 may transmit the field values for the "source" field and the field values for the "sequence number" field, to the processing engine 251Z.

Figure 5:
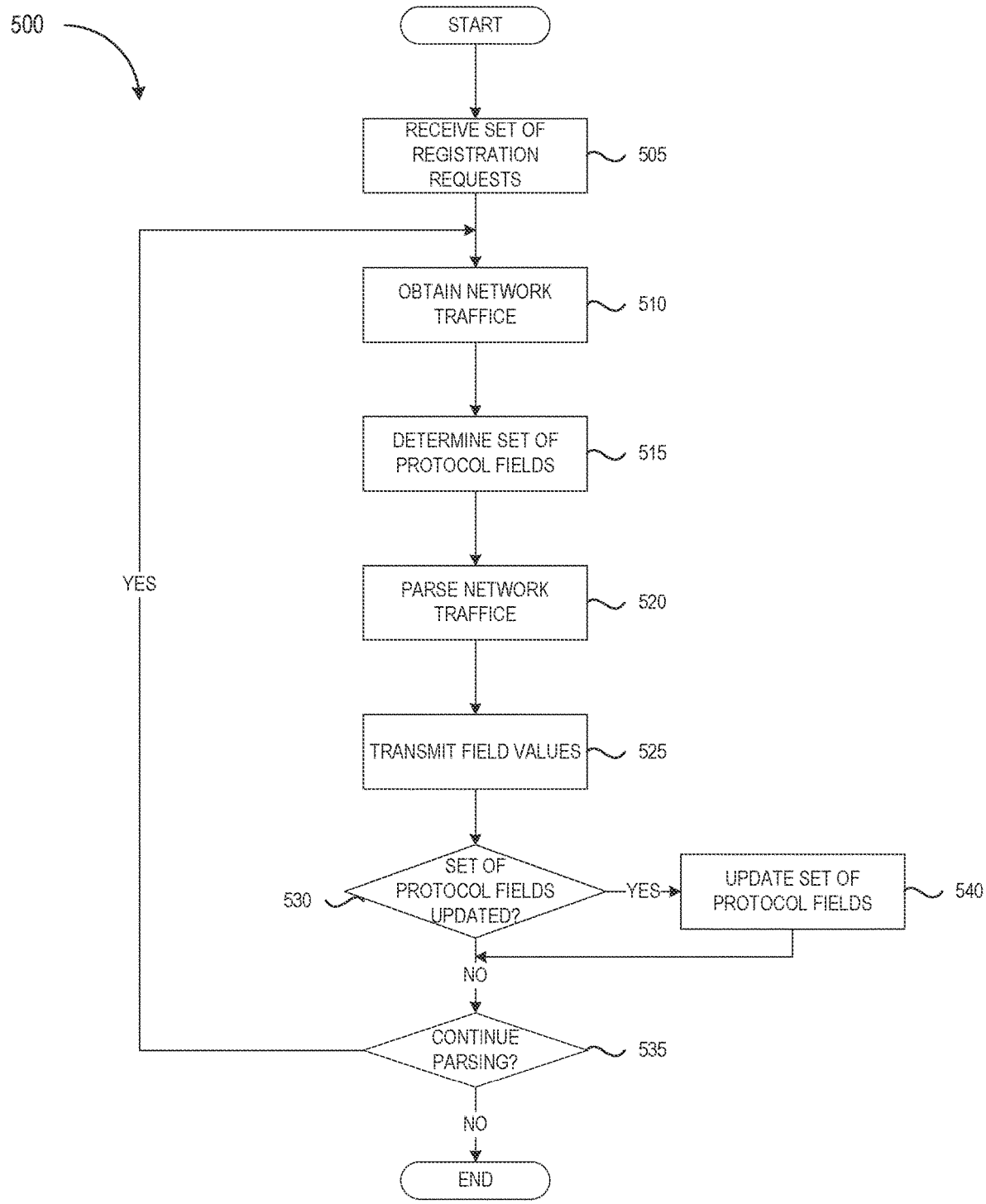
FIG. 5 depicts a flow diagram of aspects of process for parsing network traffic, in accordance with one implementation of the present disclosure.

FIG. 5 depicts a flow diagram of aspects of process 500 for parsing network traffic, in accordance with one implementation of the present disclosure. Various portions of process 500 may be performed by different components (e.g., components of system 600) of an entity or device (e.g., network monitor entity 102, network monitor entity 280, parsing engine 250, etc.). Process 500 may parse one or more protocol fields or portions thereof of network traffic for one or more processing engines (e.g., a rules engine, a security engine, a machine learning model, etc.).

At block 505, a set of registration requests are received. As discussed above, different processing engines may use field values for different protocol fields. For example, a processing engine may be a machine learning model that may classify different devices based on one or more field values for one or more protocol fields. In another example, a processing engine may be a rule engine that may perform different actions (e.g., transmit an alert, block network traffic, allow certain network traffic, etc.) based on one or more field values for one or more protocol fields. Each processing engine may transmit a registration request to a parsing engine (e.g., a parser). A registration request may indicate which protocol fields a respective processing engine may be interested in or may use. For example, a registration request may include an identifier for a processing engine and a list of one or more protocol fields. The process 500 may also update request data (or some other data, configuration file, setting, parameter, etc.), based on the registration requests. For example, the process 500 may update a table, list, etc., to indicate which processing engines requested which protocol fields.

At block 510, network traffic is obtained (e.g., accessed, read, analyzed, etc.). The traffic may have been transmitted by and/or received by a device. The traffic may be obtained by a network monitoring device (e.g., network monitoring devices 102 or 280) via a port mirroring or SPAN port or via another method, as described herein. The network traffic (e.g., packets, messages, frames, etc.) may include one or more properties and property values for each device communicatively coupled to one or more networks. The one or more properties and property values may be extracted from the network traffic. The one or more properties and property values may be based on one or more fields or portions of the one or more field within network traffic (e.g., packets, messages, frames, etc.). The network traffic may include active scanning properties (e.g., if active scanning is enabled).

In some embodiments, additional data (e.g., including properties and property values) is further accessed from third party systems (e.g., system 150, an external system, etc.) and used along with the network traffic. The data from third party systems may be accessed from the third party systems via a plugin or module of a network monitoring device. For example, this data could be accessed from a variety of systems including, but not limited to, a vulnerability assessment (VA) system, a threat detection (TD) system, endpoint management system, a mobile device management (MDM) system, a firewall (FW) system, a switch system, an access point system, a WMI script, network infrastructure, a device itself, etc.

In some embodiments, the network traffic is obtained based on an entity being selected or being communicatively coupled to a network. The entity may be selected as part of a periodic scan of the network (e.g., a scan of network 100 by network monitoring device 102). The entity may further be selected as part of a continuous, real-time, or combination thereof scan of the network. The entity may be an endpoint, a user, a device etc., as described herein. An entity being communicatively coupled to the network may be detected (e.g., being communicatively coupled to network device 105 or other enforcement point). The detecting of the entity coupled to the network may include detecting the entity in response to the entity being recoupled or readmitted to the network. This may further include detecting that a user has logged into a machine or the active user account on an entity has changed.

At block 515, a set of protocol fields is determined. The set of protocol fields may be determined based on request data. For example, the parsing engine may access the request data to determine which protocol fields are indicated by the request data. The request data may include entries that indicate different protocol fields that the parsing engine should parse (e.g., read, analyze, extract, etc.). The request data may also include a list of processing engines that request each of the different protocol fields. For example, each entry in the request data may include a protocol field and a corresponding list of one or more processing engines that requested the protocol field (e.g., a list of identifiers for the processing engines).

The network traffic is parsed at block 520. The parsing engine may parse the network traffic by analyzing or reading certain or select portions of the network traffic based on the set of protocol fields. For example, different protocol fields may be located at different portions (e.g., at different bytes, different byte offsets, etc.) of network traffic (e.g., messages, packets, frames, etc.). The parsing engine may read the values (e.g., field values) of the different portions of the network traffic (e.g., of the different protocol fields). As discussed, the field values may be used by different processing engines for various purposes (e.g., device classification, security actions, etc.).

The different fields values of the protocol fields (that were parsed by the parsing engine) are transmitted to the processing engines at block 525. As discussed above, the request data may indicate which processing engines requested each protocol field. Each entry in the request data may indicate a protocol field and a corresponding list of processing engines. The parsing engine may identify one or more processing engines for a protocol field and may transmit the field values of that protocol field to the one or more processing engines. For example, the parsing engine may use the identifiers for the one or more processing engines to transmit the fields values to the appropriate processing engines.

At block 530, the process 500 may determine whether the set of protocol fields were updated. As discussed above, a processing engine may transmit an updated registration request. The updated registration request may include one or more different protocol fields that are requested by the processing engine. For example, the updated registration may indicate a new protocol field that is requested by the processing engine. In another example, the updated registration request may remove a protocol field (e.g., may indicate that the processing engine is no longer interested in a protocol field). In one embodiment, the set of protocol fields may be updated when a new processing engine sends a registration request. For example, a processing engine that has not previously registered with the parsing engine, may send a registration request. The registration request may indicate new protocol fields that were not previously indicated by the request data. The registration request may also indicate protocol fields that were previously in the request data (e.g., may indicate that the new processing engine is interested in protocol fields that are already being parsed by the parsing engine). If a new registration request or an updated registration request has been received, the process 500 may determine that the set of protocol fields should be updated.

If the process 500 determines that the set of protocol fields should be updated, the set of protocol fields are updated at block 540. For example, the request data may be updated to add a new entry for a new protocol field. The new entry may also indicate a list of processing engines that requested the new protocol field. In another example, the request data may be updated to add a processing engine to the list of processing engines for an existing entry for an existing protocol field (e.g., the existing entry may be updated). In a further example, the request data may be updated to remove a processing engine from the list of processing engines for an existing entry for an existing protocol field.

At block 535, the process 500 may determine whether the continue parsing. For example, the parsing engine may determine whether it should continue parsing based on the operation of a network monitor entity. The parsing engine may continue parsing while the network monitor entity is still in operation. In another example, the parsing engine may determine whether a time period has elapsed. For example, the parsing engine may be configured to parse network traffic for a period of time and may stop parsing network traffic after the period of time has elapsed. In a further example, the parsing engine may determine whether to continue parsing based on user input. For example, a user (e.g., a network administrator) may provide user input via an interface (e.g., a graphical user interface (GUI), a command line interface, etc.) indicating whether the parsing engine should continue parsing (e.g., if certain traffic should be processed, if certain processing engine associated tasks should be performed, etc.).

Figure 6:
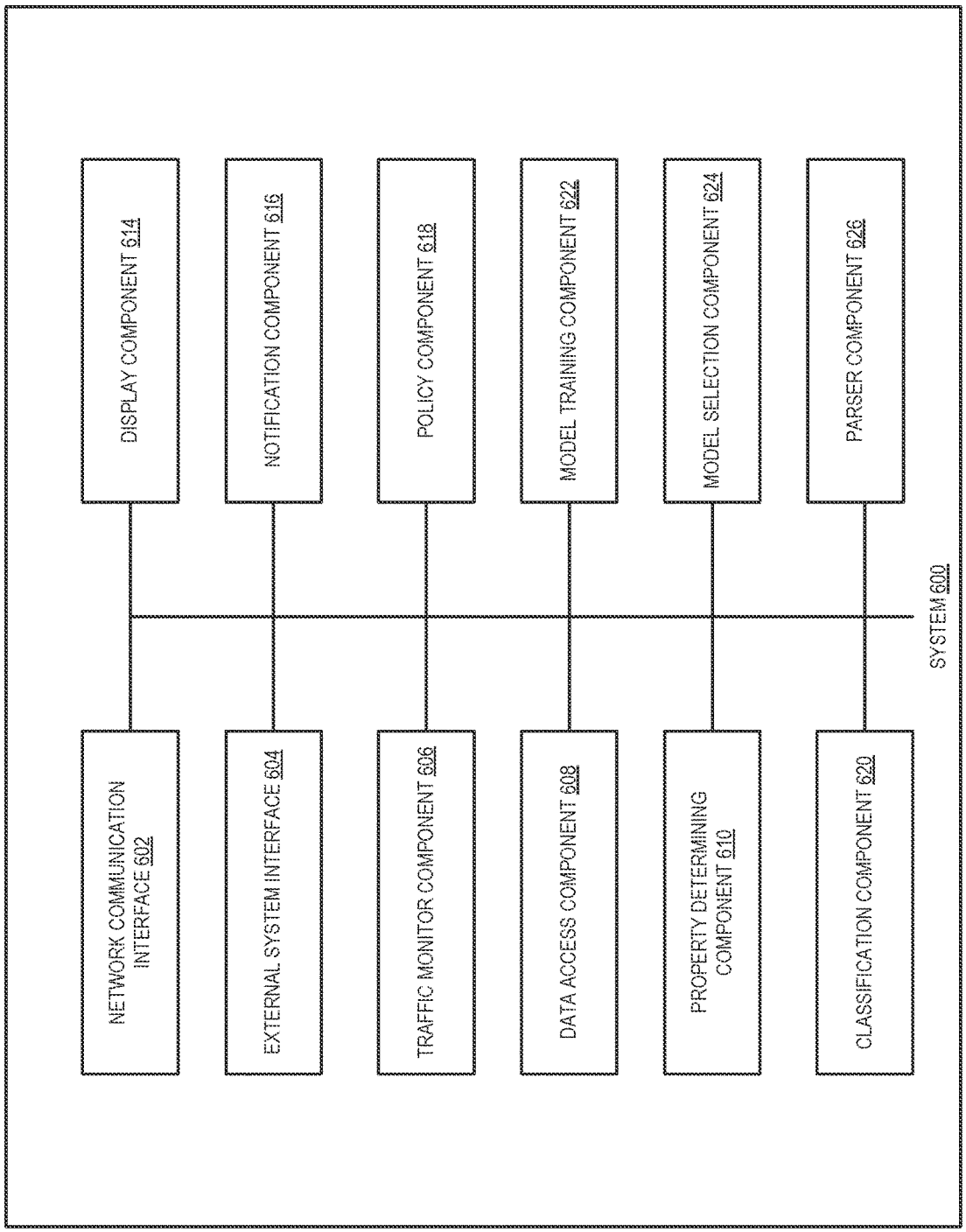
FIG. 6 depicts illustrative components of a system for parsing network traffic, in accordance with one implementation of the present disclosure.

FIG. 6 illustrates example components used by various embodiments. Although specific components are disclosed in system 600, it should be appreciated that such components are examples. That is, embodiments are well suited to having various other components or variations of the components recited in system 600. It is appreciated that the components in system 600 may operate with other components than those presented, and that not all of the components of system 600 may be required to achieve the goals of system 600.

FIG. 6 depicts illustrative components of a system for parsing network traffic, in accordance with one implementation of the present disclosure. Example system 600 or parser 600 includes a network communication interface 602, an external system interface 604, a traffic monitor component 606, a data access component 608, a property determination component 610, a display component 614, a notification component 616, a policy component 618, a classification component 620, a model training component 622, and a model selection component 624. The components of system 600 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of a device, perform one or more actions, as described herein. For example, the system 600 may further include a memory and a processing device, operatively coupled to the memory, which may perform the operations of or execute the components of system 600. The components of system 600 may access various data and characteristics or properties associated with a device (e.g., network communication information) and data associated with one or more entities. It is appreciated that the modular nature of system 600 may allow the components to be independent and allow flexibility to enable or disable individual components or to extend, upgrade, or combination thereof components without affecting other components thereby providing scalability and extensibility. System 600 may perform one or more blocks of sequence or flow diagrams 400-500. In some embodiments the components of 600 may be part of network monitor entity (e.g., network monitor entities 102 and 280), in the cloud, or the various components may be distributed between local and cloud resources.

Communication interface 602 is operable to communicate with one or more entities (e.g., network device 104, firewall 206, switch 210, other devices coupled thereto, devices 220-222, etc.) coupled to a network that are coupled to system 600 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 602 may be operable to work with one or more components to initiate access to characteristics or determination of characteristics of a device to allow determination of one or more properties which may then be used for device compliance, asset management, standards compliance, classification, identification, etc., as described herein. Communication interface 602 may be used to receive and store network traffic for determining properties, as described herein.

External system interface 604 is operable to communicate with one or more third party, remote, or external systems to access information including characteristics or properties about a device (e.g., to be used to determine a security aspects). External system interface 604 may further store the accessed information in a data store. For example, external system interface 604 may access information from a vulnerability assessment (VA) system to enable determination of one or more compliance or risk characteristics associated with the device. External system interface 604 may be operable to communicate with a vulnerability assessment (VA) system, an advanced threat detection (ATD) system, a mobile device management (MDM) system, a firewall (FW) system, a switch system, an access point (AP) system, etc. External system interface 604 may query a third party system using an API or CLI. For example, external system interface 604 may query a firewall or a switch for information (e.g., network session information) about a device or for a list of entities that are communicatively coupled to the firewall or switch and communications associated therewith. In some embodiments, external system interface 604 may query a switch, a firewall, or other system for information of communications associated with a device.

Traffic monitor component 606 is operable to monitor network traffic to determine if a new device has joined the network or a device has rejoined the network and monitor traffic for analysis by data access component 608, classification component 620, and model training component 622, as described herein. Traffic monitor component 606 may have a packet engine operable to access packets of network traffic (e.g., passively) and analyze the network traffic. The traffic monitor component 606 may communicate with, interact with, operate in conjunction with, etc., parser component 626. The traffic monitor component 606 may further be able to access and analyze traffic logs from one or more entities (e.g., network device 104, system 150, or aggregation device 106) or from a device being monitored. The traffic monitor component 606 may further be able to access traffic analysis data associated with a device being monitored, e.g., where the traffic analysis is performed by a third party system.

Data access component 608 may be operable for accessing data including metadata associated with one or more network monitoring entities (e.g., network monitor entities 102 or 280-282), including properties that the network monitoring device is monitoring or collecting, software versions (e.g., of the profile library of the network monitoring device), and the internal configuration of the network monitoring device. The data accessed by data access component 608 may be used by embodiments to perform classification including ensuring that the most up to date models, profiles, and other classification information is being used (e.g., by classification component 620). Data access component 608 may further access vertical or environment data and other user associated data, including vertical, environment, common type of devices for the network or network portions, segments, areas with classification issues, etc., which may be used for classification.

Data access component 608 may access data associated with active or passive traffic analysis or scans or a combination thereof. Data access component may further be able to access and analyze traffic logs from one or more entities (e.g., network device 104, system 150, or aggregation device 106) or from a device being monitored. Data access component 608 may further be able to access traffic analysis data associated with a device being monitored, e.g., where the traffic analysis is performed by a third party system. Information accessed by data access component 608 may be stored, displayed, and used as a basis for classification, model training, model evaluation, etc., as described herein.

Property determination component 610 is configured to determine one or more properties associated with a device, as described herein. Property determination component 610 may determine one or more properties and associated values associated with a device based on analysis (e.g., including extraction of properties and values, for instances, based on one or more fields of packets, frames, messages, etc.) of network traffic, as described herein. The properties can then be stored and used by other components (e.g., classification component 620, model training component 622, model selection component 624) for performing classification, training one or more models, evaluating one or more models, and performing actions (e.g., security actions), as described herein.

Classification component 620 is configured to determine one or more classifications, as described herein. Classification component 620 is further configured to determine a confidence associated with a classification (result), as described herein, which may then be compared with a confidence threshold, as described herein. Classification component 620 may use model selection component 624 to select one or more models for classification. Classification component 620 may further use profile libraries, entity or device fingerprints, etc., in conjunction or in place of classification using the one or more models, as described herein. Classification component 620 may use local resources (e.g., local classification engine 240), cloud resources (e.g., classification system 262), or a combination thereof for determining a classification.

Model training component 622 is configured to train one or more models. The models trained by model training component 622 may be used by classification component 620 to classify a device.

Model selection component 624 is configured to select a model for use by classification component 620, as described herein. Model selection component 624 may select a model based on parsing network traffic. For example, a model for classifying a device as a media streaming device, a smart device, etc., may be identified based on one or more field values determined by parsing network traffic.

Parser component 626 is configured to parse protocol fields of network traffic to determine one or more field values for one or more processing engines (e.g., blocks of process 500 and sequence diagram 400). The parser component 626 may be referred to as a parser, a parsing engine, etc. The parser component 626 may parse protocol fields based on registration requests received from different processing engines (e.g., machine learning models, rule engines, etc.).

Display component 614 is configured to optionally display one or more graphical user interfaces or other interfaces (e.g., command line interface) for depicting various information associated with entities, classification, thresholds (e.g., confidence thresholds), and models, as described herein. In some embodiments, display component 614 may display or render a hierarchy of models (e.g., tree 300), a network graph of entities including one or more classifications, access rules associated with entities, and other access rule information (e.g., access policies, access templates, etc.).

Notification component 616 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 618 is operable for initiating or triggering one or more remediation actions or security actions according to one or more policies, e.g., based on one or more classifications, as described herein. Policy component 618 may further be configured to perform other operations including checking compliance status, finding open ports, etc. In some embodiments, policy component 618 may verify that an assignment of one or more access rules to one or more enforcements points has been properly as signed or configured. Policy component 618 may restrict network access, signal a patch system or service, signal an update system or service, etc., as described herein. The policy component 618 may thus, among other things, invoke automatically (e.g., without user or human interaction) patching, automatically updating, and automatically restrict network access of a device (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 600 may be software stored on a non-transitory computer readable medium having instructions encoded thereon that, when executed by a processing device, cause the processing device to obtain network traffic from a network. The network traffic is transmitted by a set of devices or entities communicatively coupled to the network. The instructions may further cause the processing device to determine a set of protocol fields for parsing the network traffic. The set of protocol fields are associated with a set of processing engines. The instructions may further cause the processing device to parse the network traffic to determine a set of field values from the network traffic based on the set of protocol fields. The instructions may further cause the processing device to transmit the set of field values to the set of processing engines.

In some embodiments, the instructions may further cause the processing device to refrain from determining a second set of field values of a second set of protocol fields of the network traffic. In various embodiments, to refrain from determining the second set of field values of the second set of protocol fields of the network traffic, the processing device is further to determine a processing capability of the system and determine the second set of protocol fields based on the processing capability.

In some embodiments, the instructions may further cause the processing device to receive a first registration request from a first processing engine of the set of processing engines. The first registration request indicates a first subset of the set of protocol fields. To parse the network traffic, the processing device is further to determine a first subset of the set of field values from the network traffic based on the first subset of set of protocol fields. To transmit the set of field values to the set of processing engines, the processing device is further to transmit the first subset of the set of field values to the first processing engine.

In various embodiments, the instructions may further cause the processing device to receive a second registration request from a second processing engine of the set of processing engines. The second registration request indicates a second subset of the set of protocol fields. To parse the network traffic, the processing device is further to determine a second subset of the set of field values from the network traffic based on the second subset of set of protocol fields. To transmit the set of field values to the set of processing engines, the processing device is further to transmit the second subset of the set of field values to the second processing engine.

In some embodiments, the instructions may further cause the processing device to receive a request to update the set of protocol fields for parsing the network traffic and update the set of protocol fields based on the request to update the set of protocol fields. The instructions may further cause the processing device to obtain additional network traffic from the network and parse the additional network traffic to determine a second set of field values from the network traffic based on the updated set of protocol fields. The instructions may further cause the processing device to transmit the second set of field values to the set of processing engines.

In various embodiments, the request to update the set of protocol fields indicates a first protocol field to remove from the set of protocol fields. In some embodiments, the request to update the set of protocol fields indicates a first protocol field to add to the set of protocol fields. In various embodiments, the set of protocol fields are associated with a network protocol used by the set of devices or entities. In some embodiments, the network device or entity comprises the set of processing engines. In various embodiments, a first processing engine of the set of processing engines is separate from the network device or entity.

Figure 7:
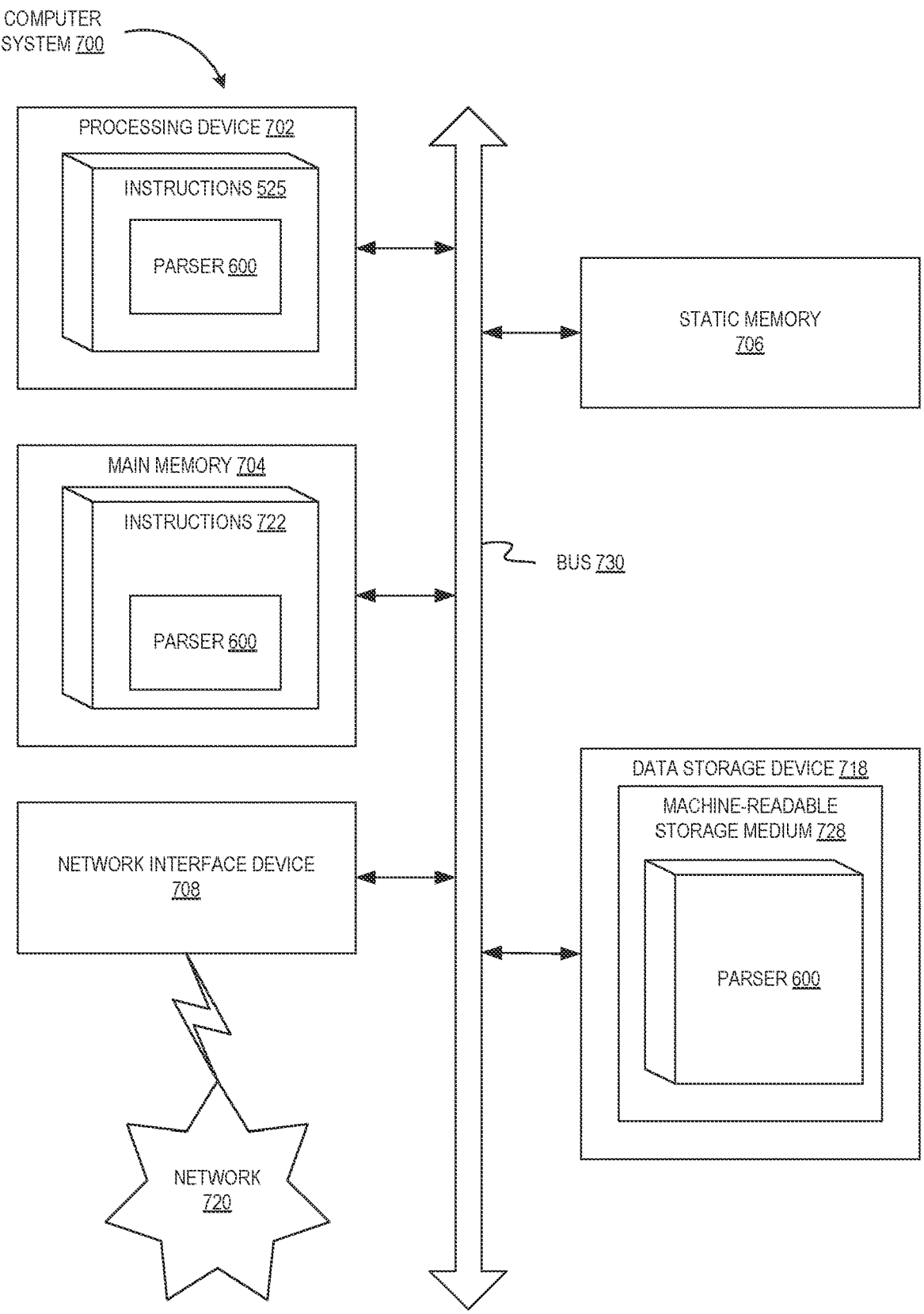
FIG. 7 is a block diagram illustrating an example computer system, in accordance with one implementation of the present disclosure.

FIG. 7 is a block diagram illustrating an example computer system, in accordance with one implementation of the present disclosure. FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as network monitor entity 102 running parser 600 to parse network traffic, as described herein.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of parser 600 shown in FIG. 6, for performing the operations and steps discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute parser 600. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for determining one or more classifications at various granularities, as described herein. The machine-readable storage medium 728 may also be used to store instructions to perform a method for training one or more models at various granularities, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
   obtaining, from a network, network traffic transmitted by a set of devices communicatively coupled to the network;
   parsing, by a parser of a network device, the network traffic to determine a set of field values from the network traffic based on a set of protocol fields indicated to the parser by a processing engine; and
   transmitting, by the parser of the network device, the set of field values to a set of processing engines.

2. The method of claim 1, further comprising:
   determining the set of protocol fields to parse the network traffic.

3. The method of claim 2, further comprising:
   refraining from determining a second set of field values of a second set of protocol fields of the network traffic by:
      determining a processing capability of the network device; and
      determining the second set of protocol fields based on the processing capability.

4. The method of claim 1, further comprising:
   receiving a first registration request from a first processing engine of the set of processing engines, wherein:
      the first registration request indicates a first subset of the set of protocol fields;
      parsing the network traffic comprises determining a first subset of the set of field values from the network traffic based on the first subset of the set of protocol fields; and
      transmitting the set of field values to the set of processing engines comprises transmitting the first subset of the set of field values to the first processing engine.

5. The method of claim 4, further comprising:
   receiving a second registration request from a second processing engine of the set of processing engines, wherein:
      the second registration request indicates a second subset of the set of protocol fields;
      parsing the network traffic further comprises determining a second subset of the set of field values from the network traffic based on the second subset of the set of protocol fields; and transmitting the set of field values to the set of processing engines further comprises transmitting the second subset of the set of field values to the second processing engine.

6. The method of claim 1, further comprising:
receiving a request to update the set of protocol fields for parsing the network traffic;
updating the set of protocol fields based on the request to update the set of protocol fields;
obtaining additional network traffic from the network;
parsing the additional network traffic to determine a second set of field values from the network traffic based on the updated set of protocol fields; and
transmitting the second set of field values to the set of processing engines.

7. The method of claim 6, wherein the request to update the set of protocol fields indicates a first protocol field to remove from the set of protocol fields.

8. The method of claim 6, wherein the request to update the set of protocol fields indicates a first protocol field to add to the set of protocol fields.

9. The method of claim 1, wherein the set of protocol fields is associated with a network protocol used by the set of devices.

10. The method of claim 1, wherein the network device comprises the set of processing engines.

11. The method of claim 1, wherein a first processing engine of the set of processing engines is separate from the network device.

12. A system, comprising:
a memory; and
a processing device, operatively coupled to the memory, to:
obtain network traffic transmitted by a set of devices communicatively coupled to a network;
parse, by a parser, the network traffic to determine a set of field values from the network traffic based on a set of protocol fields indicated to the parser by a processing engine; and
transmit the set of field values to a set of processing engines.

13. The system of claim 12, wherein the processing device is further to:
determine the set of protocol fields to parse the network traffic.

14. The system of claim 13, wherein the processing device is further to;
refrain from determining a second set of field values of a second set of protocol fields of the network traffic, and wherein to refrain from determining the second set of field values of the second set of protocol fields of the network traffic, the processing device is to:
determine a processing capability of the system; and
determine the second set of protocol fields based on the processing capability.

15. The system of claim 12, wherein the processing device is further to:
receive a first registration request from a first processing engine of the set of processing engines, wherein:
the first registration request indicates a first subset of the set of protocol fields;
to parse the network traffic, the processing device is to determine a first subset of the set of field values from the network traffic based on the first subset of the set of protocol fields; and
to transmit the set of field values to the set of processing engines, the processing device is to transmit the first subset of the set of field values to the first processing engine.

16. The system of claim 15, wherein the processing device is further to:
receive a second registration request from a second processing engine of the set of processing engines, wherein:
the second registration request indicates a second subset of the set of protocol fields;
to parse the network traffic, the processing device is to determine a second subset of the set of field values from the network traffic based on the second subset of the set of protocol fields; and
to transmit the set of field values to the set of processing engines, the processing device is to transmit the second subset of the set of field values to the second processing engine.

17. The system of claim 12, wherein the processing device is further to:
receive a request to update the set of protocol fields for parsing the network traffic;
update the set of protocol fields based on the request to update the set of protocol fields;
obtain additional network traffic from the network;
parse the additional network traffic to determine a second set of field values from the network traffic based on the updated set of protocol fields; and
transmit the second set of field values to the set of processing engines.

18. The system of claim 17, wherein the request to update the set of protocol fields indicates a first protocol field to remove from the set of protocol fields.

19. The system of claim 17, wherein the request to update the set of protocol fields indicates a first protocol field to add to the set of protocol fields.

20. A non-transitory computer readable medium having instructions encoded thereon that, when executed by a processing device, cause the processing device to:
obtain network traffic transmitted by a set of devices communicatively coupled to a network;
parse, by a parser executed by the processing device, the network traffic to determine a set of field values from the network traffic based on a set of protocol fields indicated to the parser by a processing engine; and
transmit the set of field values to a set of processing engines.

* * * * *